United States Patent
Cozzi et al.

[11] Patent Number: 5,189,135
[45] Date of Patent: Feb. 23, 1993

[54] FLUORINATED POLYURETHANES WITH HYDROXY FUNCTIONALITY, PROCESS FOR PREPARING THEM AND THEIR USE FOR THE TREATMENT OF LITHOIDAL MATERIAL

[75] Inventors: Ennio Cozzi, Milan; Franco Federici, Varese; Paolo Parrini, Novara, all of Italy

[73] Assignee: Syremont S.p.A., Milan, Italy

[21] Appl. No.: 879,124

[22] Filed: May 5, 1992

Related U.S. Application Data

[63] Continuation of Ser. No. 543,546, Jun. 26, 1990, abandoned.

[30] Foreign Application Priority Data

Jun. 28, 1989 [IT] Italy .................. 21018 A/89

[51] Int. Cl.$^5$ ............................................. C08G 18/50
[52] U.S. Cl. ................................. 528/70; 560/115; 560/116; 560/157
[58] Field of Search ............... 528/70; 560/115, 116, 560/157

[56] References Cited

U.S. PATENT DOCUMENTS

| | | | |
|---|---|---|---|
| 3,642,705 | 2/1972 | Zollinger . | |
| 3,755,265 | 8/1973 | Fletcher et al. | 528/70 |
| 3,849,504 | 11/1974 | Mitsch et al. | 528/70 |
| 3,972,856 | 8/1976 | Mitsch et al. | 528/70 |
| 4,704,420 | 11/1987 | Federici et al. | 560/115 |
| 4,782,130 | 11/1988 | Re et al. | 528/70 |
| 4,849,493 | 7/1989 | Re et al. | 528/70 |
| 4,863,986 | 9/1989 | Re et al. | 528/70 |
| 5,026,814 | 6/1991 | Re et al. | 528/70 |
| 5,043,410 | 8/1991 | Re et al. | 528/70 |

FOREIGN PATENT DOCUMENTS 0235380  9/1987  European Pat. Off.

Primary Examiner—Morton Foelak
Assistant Examiner—John M. Cooney, Jr.
Attorney, Agent, or Firm—Stevens, Davis, Miller & Mosher

[57] ABSTRACT

Low molecular weight non-film forming fluorinated polyurethanes having a hydroxy functionality obtained from the reaction of at least one diisocyanate with at least one hydroxy-capped perfluoropolyether having a molecular weight within the range of from greater than 1,000 to 5,000 and with at least one polyol with a functionality of at least 2.

16 Claims, No Drawings

5,189,135

FLUORINATED POLYURETHANES WITH HYDROXY FUNCTIONALITY, PROCESS FOR PREPARING THEM AND THEIR USE FOR THE TREATMENT OF LITHOIDAL MATERIAL

This application is a continuation of application Ser. No. 543,546, filed Jun. 26, 1990, now abandoned.

FIELD OF THE INVENTION

The present invention is concerned with fluorinated polyurethanes with hydroxy functionality and with their use for the treatment of lithoidal materials.

More in particular, the present invention relates to fluorinated polyurethanes with hydroxy functionality and to their use in the preparation of protective compositions endowed with high characteristics of light resistance and impermeability to water.

Still more particularly, the present invention is concerned with fluorinated polyurethane compositions with hydroxy functionality, which are endowed with the capability of performing a strong waterproofing action, understood as action of protection from the aggressive action of moisture and water, as well as of the salts dissolved in said water, with the characteristics of permeability to gases and vapors of the lithoidal materials submitted to the treatment remaining unaltered.

The compositions according to the present invention make possible a protective action, which remains unaltered over a very long time, even when the treated material is exposed to severe environmental conditions of decay and aging.

BACKGROUND OF THE INVENTION

It is well-known that many materials show a tendency to decay over time and turn into extremely porous materials, before being completely destroyed, owing to the action by environmental chemical factors, or due to causes—also natural—decay or aging. Typical examples of materials which undergo such an action are many kinds and types of stones, such as bricks, marble, building materials, and so forth.

The problem of the preservation of these materials is of basic importance in those cases in which one wishes to preserve the concerned good, or building, with its original appearance, and a more or less integral replacement is not desired. This problem arises, e.g., in case of cultural, artistic, hystorical and archaeological goods, for which the witness has to be preserved for a time as long as possible.

It is well-known that the materials which are most subject to such effects of intense decay are the lithoidal monuments such as churches, palaces, buildings, and so forth, which, by being in continuous contact with the more or less polluted atmospheres of towns and/or of the surrounding environment, are exposed to continuous attack by such chemical agents as sulfur oxides or nitrogen oxides which, in the presence of atmospheric humidity, exert an action which modifies to a substantial extent the nature of the materials they were built from. These chemical attacks, combined with the natural changes of temperature, causes changes in color, or the formation of crusts, scales, films, crevices, and so forth, with a consequent progressive and unarrested loss of in material cohesion.

In this case, the intervention for preservation requires a preliminary cleaning and a subsequent protecting treatment. These steps protect the various elements or parts, in such a way as to protect the good, or its most meaningful details, such as decorations, reliefs, and so forth, from the aggressive agents.

In order to obtain such protection, it is known to coat or impregnate the lithoidal good or material with film-forming polymeric substances such as acryl, vinyl, silicone resins, and so forth, which show good adhesive properties, good resistance to the atmospheric agents and a fairly good resistance to aging caused by the action of light or of other atmospheric agents. The main drawback shown by these polymeric substances is that they form a surface film which, although is very thin, is not permeable to air, vapors and other gases. Such an impermeable coating leads to the formation of accumulations of vapors in the material, to the concentration of salts and to a full range of processes which cause even evident and irreparable damage to the treated material. In fact, it is well-known that the "breathing" of a lithoidal material, whether of stone, brick, marble or the like, is of basic importance for a correct and durable preservation thereof.

The purpose of the instant invention is to provide a product for protecting lithoidal materials which, besides being colorless and having good properties of adhesion and very good characteristics of resistance to light, moisture, water and to atmospheric agents, does not substantially modify the permeability to gases and vapors, and furthermore shows no film-forming properties, as well as characteristics of reversibility.

The present Applicant has found now that polyurethanes with hydroxy functionality, containing moieties of perfluoropolyether in their chain, are products showing the above specified characteristics.

SUMMARY OF THE INVENTION

Therefore, the subject-matter of the instant invention is fluorinated polyurethanes with hydroxy functionality obtained from the reaction of at least one organic diisocyanate with at least one hydroxy-capped perfluoropolyether and the subsequent reaction of the so obtained product with a polyol with a functionality of at least 2 and in which the ratio of the equivalents of isocyanate groups to total hydroxy groups is lower than, or equal to, 1.

Values of the ratio of NCO equivalents to total OH equivalents within the range of from 0.001 to 1 are those which are more commonly used.

DESCRIPTION OF THE INVENTION

Any diisocyanates of general formula:

$$\text{NCO}-\text{R}_1-\text{NCO} \tag{I}$$

wherein $R_1$ is selected from among alkylene, cycloalkylene, alkylene-cycloalkylene or arylene radicals containing from 1 to 20 carbon atom, can be used in order to prepare the fluorinated polyisocyanates according to the present invention.

Examples of useable polyisocyanates are: 2,4-toluene-diisocyanate either alone or in mixture with 2,6-toluene-diisocyanate isomer, 4,4'-diphenylmethane-diisocyanate; 4,4'-dicyclohexyl-methane-diisocyanate; 1-isocyanato-3-isocyanato-methyl-3,5,5-trimethyl-cyclohexane (isophorene-diisocyanate); 2,2,4-trimethyl-hexamethylene-diisocyanate in mixture with 2,4,4-trimethylhexamethylene-diisocyanate isomer; ethylidene-diisocyanate; butylene-diisocyanate, pentamethylene-diisocyanate, hexamethylene-diisocyanate, cyclopentylene-1,3-diisocyanate, cyclohexylene-1,4-diisocyanate, cyclohexylene-1,2-diisocyanate, xylilene-diisocyanate, dichloro-hexamethylene-diisocyanate, dicyclohexyl-4,4'-diisocyanate, 1,2-di-(isocyanatomethyl-cyclobutane), 1-methyl-2,4-diisocyanato-cyclohexane, 1-methyl-2,6-diisocyanato-cyclohexane, and so forth; aliphatic diisocyanates containing ether groups, such as 1,3-bis-(gamma-isocyanato-propoxy)-2,2-dimethyl-propane, and so forth. Among these, the aliphatic diisocyanate, such as isophorone-diisocyanate, are preferred.

Any of the polyols having a functionality of at least 2 can be used in the synthesis of polyurethanes according to the present invention. Polyols with a molecular weight lower than 500, such as ethylene glycol, propylene glycol, 1,4-butanediol, trimethylol-propane, trimethylol-ethane, glycerol, 1,2,6-hexane-triol, pentaerythritol, neopentyl glycol, hydrogenated bisphenol A, are preferred.

High molecular weight polyols, e.g., having a molecular weight higher than 500, such as polyethyleneglycol 1000, polyethyleneglycol 2000, polypropyleneglycol 1000, polypropyleneglycol 2000, polytetramethyleneglycol, polycaprolactone-diol, and so forth, can be used as well.

The hydroxy-capped perfluoropolyethers used in the preparation of polyurethanes according to the present invention are fluoropolyoxyalkylene ethers, having an average molecular weight comprised within the range of from 400 to 7000 and have the general formula:

$$OH-R_f-OH \qquad (II)$$

wherein the $R_f$ radical can be selected from among those having the formula:

$$-R-CF_2-O-(C_2F_4O)_m-(CF_2O)_n-CF_2-R-$$

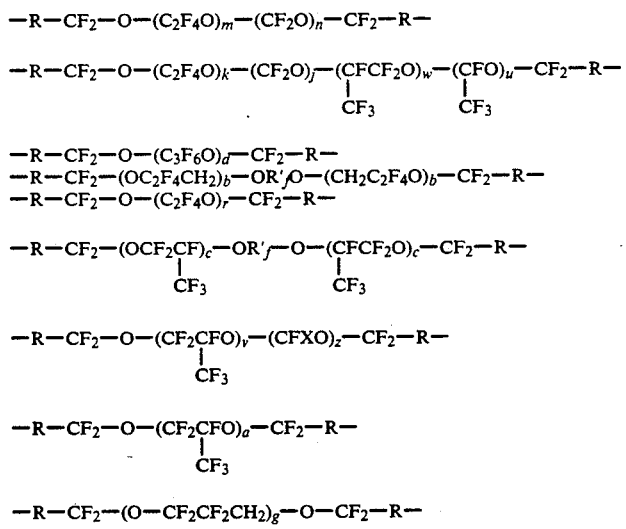

wherein:
R is selected from among:

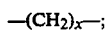
$-(CH_2)_x-$;

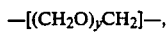
$-[(CH_2O)_y CH_2]-$, and

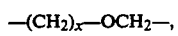
$-(CH_2)_x-OCH_2-$, with x and y being integers comprised within the range of from 1 to 4;

m and n are integers with a ratio of m to n comprised within the range of from 0.2 to 2, and preferably comprised within the range of from 0.5 to 1.2;

$R'_f$ is a perfluoroalkylene radical;

X is either F or $CF_3$;

k, j, w, u, d, b, r, c, v, z, a, g are integers which make it possible molecular weights comprised within the range of from 400 to 7000 to be obtained.

The perfluoropolyethers of general formula (II) are products known from the prior art, and can be obtained according to such processes as disclosed in the following patents: U.S. Pat. Nos. 3,242,218; 3,665,041; 3,715,378 and U.S. Pat. No. 4,523,039; or in published European patent applications Nos. 148,482; 151,877; 165,649 and 165,650, whose contents are herein incorporated by reference in their entirety.

The perfluoropolyethers are known on the market under the trade marks FOMBLIN ® and GALDEN ®, manufactured and traded by Montefluos S.p.A., with registered office at Milan.

The fluorinated polyurethanes with hydroxy functionality according to the present invention having an average molecular weight higher than 1000, and preferably comprised within the range of from 2000 to 5000, a hydroxy functionality higher than, or equal to, 2, and generally comprised within the range of from 2 to 6, a fluorine content larger than 30% by weight, and preferably comprised within the range of from 35 to 50% and are soluble in most organic solvents, such as, e.g., esters, ketones, glycolethers and chlorofluorocarbons.

A process for preparing the fluorinated polyurethanes with hydroxy functionality according to the present invention comprises:

(a) reacting the diisocyanate and the hydroxy-capped perfluoropolyether at a temperature comprised within the range of from 40° to 100° C., with a ratio of NCO equivalents to OH equivalents of about 2;

(b) reacting the product from the (a) step with the polyol with functionality of at least 2, at a temperature comprised within the range of from 40° to 100° C., with a ratio of NCO equivalents of (a) to OH equivalents smaller than, or equal to, 0.5, and preferably comprised within the range of from 0.25 to 0.5, including the limits.

According to an alternative form of practical embodiment, step (b) can be followed by at least one further double step of reaction in which a treatment with a diisocyanate and then with a polyol is carried out under the same conditions as disclosed above.

The reactions of steps (a) and (b) and of the possible successive steps are preferably carried out in a solvent inert at reaction temperatures; examples of such solvents are glycolethers, such as methoxypropanol, methyl-cellosolve, acetates, such as methyl-cellosolve acetate, methoxypropanol acetate, butoxyethanol acetate, etc., as well as esters, such as ethyl acetate, butyl acetate, etc., N-methylpyrrolidone, and so forth.

In order to increase the reaction rate, the process is preferably carried out in the presence of suitable catalysts.

Examples of such catalysts are: tertiary amines, such as triethylenediamine, N-ethyl-ethylene-imine, tetramethylguanidine, dimethylcyclohexylamine, and so forth; the organometallic activators, such as dibutyltin dilaurate, tin octanoate, cobalt naphthenate, vanadium acetylacetonate, dimethyl-tin-diethylhexanoate and their mixtures.

Triethylenediamine and dibutyltin dilaurate are preferred catalysts.

Said catalysts are used in catalytic concentrations, and in general at concentrations not higher than 0.1% by weight.

The fluorinated polyurethanes with hydroxy functionality according to the instant invention can be used in the treatment of lithoidal materials as protective agents endowing such lithoidal materials with hydrophobic properties and cohesion properties, and so forth. They are preferably used as solutions with a concentration comprised within the range of from 1 to 20% by weight, and preferably comprised within the range of from 1 to 5% by weight.

As solvents, the same solvents as used in the preparation, or other diluent solvents compatible with them can be used. Examples of diluent solvents are alcohols, such as ethanol, isopropanol, and so forth; glycolethers, ketones as acetone, methyl-ethyl-ketone, and so forth; chlorofluorocarbons, or mixtures thereof.

For the purpose of better understanding the present invention and in order to practice it, some illustrative, non-limitative examples are reported in the following.

EXAMPLE 1

44.46 g of isophorone-diisocyanate (0.2 mol), 200 g of Fomblin Z-DOL 2000 (0.1 mol), 38.6 g of ethyl acetate and 0.066 g of DABCO T12 CL (dibutyltin dilaurate) are charged under a nitrogen blanketing atmosphere to a reactor of 500 cc of capacity equipped with stirring means, thermometer and reflux condenser. The reaction mixture is heated up to 55° C. within a 20-minute period, then is slowly heated up to its refluxing temperature: about 75° C. The reaction mixture is kept at this temperature until a content of NCO is reached, which is not higher than 3%, as referred to the total reaction mixture (dry solids=86.3%). The reaction mixture is then cooled to 40° C. and then 18 g of 1,4-butanediol is added to it. The temperature is increased again up to 75° C. within a 30-minutes time, and the reaction mixture is kept at this temperature until NCO groups disappear (about 3 hours). The reaction mixture is cooled and 13.9 g of ethyl acetate is added in order to have a an end theoretical content of 80% of dry solids.

EXAMPLE 2

The process is carried out in the same way as of Example 1, until the specified value of NCO content is reached. The reaction mass is then cooled down to 55° C. and 21.3 g of neopentyl glycol (2.05 mol) dissolved in 21 g of ethyl acetate are added. The temperature is increased up to reaction mixture refluxing value: about 78° C., within 2.5 hours. The reaction mass is kept at this temperature until NCO groups disappear: about 1 hour. The temperature is decreased down to 60° C. and the reaction mass is diluted with 20.2 g of ethyl acetate, in order to adjust the theoretical value of the end content of dry solids to 70%.

EXAMPLE 3

44.46 g of isophorone-diisocyanate (0.2 mol), 200 g of Fomblin Z-DOL 2000 (0.1 mol), 6.1 g of methoxypropanol acetate (80% of dry solids) and 0.06 of DABCO T12 CL are charged to an equipment similar to that as used in Example 1.

The temperature of the reaction mass is slowly increased up to 90° C., then is kept at this value until NCO=2.8% max (about 1.5 hours).

The temperature is decreased to 70° C., and 26.8 g of trimethylolpropane (0.3 mol) and 55.1 g of methoxypropanol acetate (70% of solids) are charged. The temperature is increased again to 90° C. and is maintained at this value until NCO groups disappear (about 2.5 hours).

19.5 g of ethyl acetate is then added, in order to adjust the theoretical value of the end content of dry solids to 50%.

EXAMPLE 4

The process is carried out with an equipment similar to the one used in Example 1, and the same amounts of isophorone-diisocyanate, Fomblin Z-DOL 2000 and DABCO T12 CL, and 27.1 g of ethyl acetate (90% of dry solids) are charged. The reaction mixture is slowly heated up to its refluxing temperature: about 80° C., and is kept at this value until a content of NCO=2.6% max., as referred to total reaction mixture, is reached.

Then, with the temperature being still kept at 80° C., 49.2 g of hydrogenated bisphenol A (2.05 mols) dissolved in 50 g of methoxypropanol acetate are added. The reaction mass is then kept at 80° C. until NCO groups disappear: about 4 hours. 48.7 g of methoxypropanol acetate is added and the reaction mass is cooled. Theoretical value of end content of dry solids: 70%.

EXAMPLE 5

The process is carried out in the same way as of Example 1, with ethyl acetate being replaced by methoxypropanol acetate and with the reaction temperature being of 90° C. instead of 75° C. When the reaction is complete and with the content dry solids of the reaction product being adjusted at 80%, the reaction product, instead of being cooled and discharged, is processed as follows: a further 44.46 g of isophorone-diisocyanate (0.2 mol) is added, the temperature is increased up to 90° C. and is maintained at that value until NCO=2.3% max, as referred to total reaction mixture: about 45 minutes. 26.8 g of trimethylolpropane (0.3 mol) and 81.3 g of methoxypropanol acetate (70% of solids) are then added. The temperature is increased again to 90° C. and is kept at this value until NCO groups totally disappear:

about 3 hours. The temperature of the reaction mass is decreased to 70° C. and 79.5 g of methoxypropanol acetate is added in order to adjust the end value of the theoretical content of dry solid to 60%.

The physical and chemical characteristics of the products obtained in Examples 1-5 are reported in Table 1.

TABLE 1

| Characteristics | Example 1 | Example 2 | Example 3 | Example 4 | Example 5 |
|---|---|---|---|---|---|
| Physical appearance | * | * | * | * | * |
| Measured dry residue, % | 80 | 69.10 | 50 | 69.7 | 60 |
| Viscosity, mPa · s at 23° C. | 2400 | 250 | 400 | 7500 | 5000 |
| Hydroxy functionality | 2 | 2 | 4 | 2 | 4 |
| Solvent | AE | AE | PMA/NMP 2:3 | PMA/AE 4:1 | PMA |
| Resistance to U.V. C (wavelength 253 nm) ΔE after 400 hours of exposure (ASTM D 2244-79 range B2) | 0.4 | 0.4 | 0.3 | 0.8 | 0.4 |
| Contact angle (Aticelca MC 21-72) | 104° | 108° | 107° | 105° | 106° |
| Softening point of dry polyurethane | <30° C. | 50° C. | <30° C. | 130° C. | 55-60° C. |
| Average molecular weight of dry polyurethane | 2600 | 2600 | 2700 | 2900 | 3250 |
| Fluorine % content, as measured on dry polyurethane | 50 | 50 | 48 | 44 | 40 |

* = slightly cloudy liquid
PMA = methoxypropanol acetate
NMP = N-methyl-pyrrolidone
AE = ethyl acetate

EXAMPLE 6

The solution of Example 1 was diluted with DELIFRENE AC by Montefluos S.p.A. of Milan to a content of 1.5% by weight of dry solids. This solution was applied by means of a brush onto two groups of specimens of sandstone (5×5×2 cm), whose water absorption had been tested by using pipettes for a total time of 30 minutes, so as to obtain a deposit of 30 and 41 g/m² of dry polyurethane on each specimen respectively belonging to said groups.

Subsequently, the absorption of water by the treated specimens was measured by means of the same method, and the protective efficacy of the treatment was determined. The obtained values are reported in Table 2.

EXAMPLE 7

The test was carried out in the same way as of Example 6, using specimens of "Lecce" stone, and the formulation of Example 4. The deposits on the specimens of the two test groups were respectively of 50 and 96 g/m². The results are reported in Table 2.

EXAMPLE 8

The solution of Example 5, diluted with DELIFRENE AC at 14% by weight was applied by dipping on a specimen of plaster of 1 cm of average thickness and with a surface-area of 1 dm². The permeability to water vapor was measured (According to ASTM E 96) before and after the treatment. The results were respectively of 11.6 g/hm² and 7.9 g/hm².

TABLE 2

| | Deposit g/m² | Protective efficacy % (*) |
|---|---|---|
| Example 6: | | |
| * 1st Group | 30 | 74 |
| * 2nd Group | 41 | 99 |
| Example 7: | | |
| * 1st Group | 50 | 93 |
| * 2nd Group | 96 | 100 |

(*) The protective efficacy is expressed as the percent ratio of the difference in water absorption values before and after the protective treatment, to the value of water absorption before the same treatment.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are all hereby incorporated by reference.

What is claimed is:

1. Low molecular weight non-film forming fluorinated polyurethanes with hydroxy functionality obtained from (1) the reaction of at least one organic diisocyanate with at least one hydroxy-capped perfluoropolyether to produce a product and (2) reacting the product with a polyol, having a functionality of least 2, and in which the ratio of the equivalents of isocyanate groups to total hydroxy groups is lower than or equal to 1, said low molecular weight fluorinated polyurethane having an average molecular weight between greater than 1,000 and 5,000, a hydroxy functionality greater than or equal to 2, a fluorine content larger than 30% by weight, and said fluorinated polyurethane is soluble in organic solvents.

2. Polyurethanes according to claim 1, wherein the ratios of NCO equivalents to total OH equivalents are within the range of from 0.001 to 1.

3. Polyurethanes according to claim 1 wherein the diisocyanate is selected from among the compounds of general formula:

$$NCO-R_1-NCO \qquad (I)$$

wherein $R_1$ is selected from among alkylene, cycloalkylene, alkylene-cycloalkylene or arylene radicals containing from 1 to 20 carbon atoms.

4. Polyurethanes according to claim 1, wherein the polyol having a functionality of at least 2 has a molecular weight lower than 500.

5. Polyurethanes according to claim 1 wherein the hydroxy-capped perfluoropolyethers are fluoropolyoxyalkylene ethers have the formula:

$$OH-R_f-OH \qquad (II)$$

wherein the $R_f$ radical can be selected from among those having the formula:

$$-R-CF_2-O-(C_2F_4O)_m-(CF_2O)_n-CF_2-R-$$

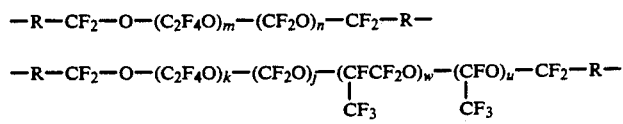

$$-R-CF_2-O-(C_2F_4O)_k-(CF_2O)_j-(CFCF_2O)_w-(CFO)_u-CF_2-R-$$
$$\qquad\qquad\qquad\qquad\qquad\quad |\qquad\qquad\quad\;\; |$$
$$\qquad\qquad\qquad\qquad\qquad\; CF_3\qquad\qquad CF_3$$

-continued $$-R-CF_2-O-(C_3F_6O)_d-CF_2-R-$$
$$-R-CF_2-(OC_2F_4CH_2)_b-OR'_f-O-(CH_2C_2F_4O)_b-CF_2-R-$$
$$-R-CF_2-O-(C_2F_4O)_r-CF_2-R-$$

$$-R-CF_2-(OCF_2CF)_c-OR'_f-O-(CFCF_2O)_c-CF_2-R-$$
$$\phantom{-R-CF_2-(OCF_2}\underset{CF_3}{|}\phantom{)_c-OR'_f-O-(CF}\underset{CF_3}{|}$$

$$-R-CF_2-O-(CF_2CFO)_v-(CFXO)_z-CF_2-R-$$
$$\phantom{-R-CF_2-O-(CF_2}\underset{CF_3}{|}$$

$$-R-CF_2-O-(CF_2CFO)_a-CF_2-R-$$
$$\phantom{-R-CF_2-O-(CF_2}\underset{CF_3}{|}$$

$$-R-CF_2-(O-CF_2CF_2CH_2)_g-O-CF_2-R-$$

wherein:

R is selected from among:

—(CH$_2$)$_x$—;

—[(CH$_2$O)$_y$CH$_2$]—, and

—(CH$_2$)$_x$—OCH$_2$—, with x and y being integers within the range of from 1 to 4;
m and n are integers with a ratio of m to n within the range of from 0.2 to 2;
R'$_f$ is a perfluoroalkylene radical;
X is either F or CF$_3$;
k, j, w, u, d, b, r, c, v, z, a, g are integers which make possible molecular weights within the range of from 400 to 7000 to be obtained.

6. Process for preparing fluorinated polyurethanes with hydroxy functionality according to claim 1, comprising:
   (a) reacting the diisocyanate and the hydroxy-capped perfluoropolyether at a temperature within the range of from 40° to 100° C. with a ratio of NCO equivalents to OH equivalents of about 2;
   (b) reacting the product from the (a) step with the polyol with functionality of at least 2, at a temperature within the range of from 40° to 100° C., with a ratio of NCO equivalents of (a) to OH equivalents less than or equal to 0.5, including the limits.

7. Process according to claim 6 wherein the (b) step is followed by at least a further double step of reaction in which a treatment with a diisocyanate and then with a polyol is carried out under the same conditions as above disclosed.

8. Process according to claim 6 wherein the reactions of above (a) and (b) steps and of the possible successive steps are carried out in a solvent inert at reaction temperature.

9. Method of using fluorinated polyurethanes with hydroxy functionality according to claim 1, as protective agents in the treatment of lithoidal materials.

10. Method of use according to claim 8, wherein polyurethanes are used as solutions with a concentration within the range of from 1 to 20% by weight.

11. Polyurethanes according to claim 5, wherein m and n are integers with a ratio of m to n within the range of from 0.5 to 1.2.

12. Polyurethanes according to claim 1, having a hydroxy functionality within the range of from 2 to 6.

13. Polyurethanes according to claim 1, having a fluorine content within the range of from 35 to 50% by weight.

14. Process for preparing fluorinated polyurethanes with hydroxy functionality according to claim 6, and within the range of from 0.25 to 0.5.

15. Method of use according to claim 10, wherein polyurethanes are used as solutions with a concentration preferably within the range of from 1 to 5% by weight.

16. Polyurethanes according to claim 1, wherein the polyol has a molecular weight of greater than 500 to 2,000.

* * * * *